Feb. 13, 1934.  A. ALLEN ET AL  1,946,924
CALIPERING MECHANISM
Filed Feb. 18, 1928    2 Sheets—Sheet 1
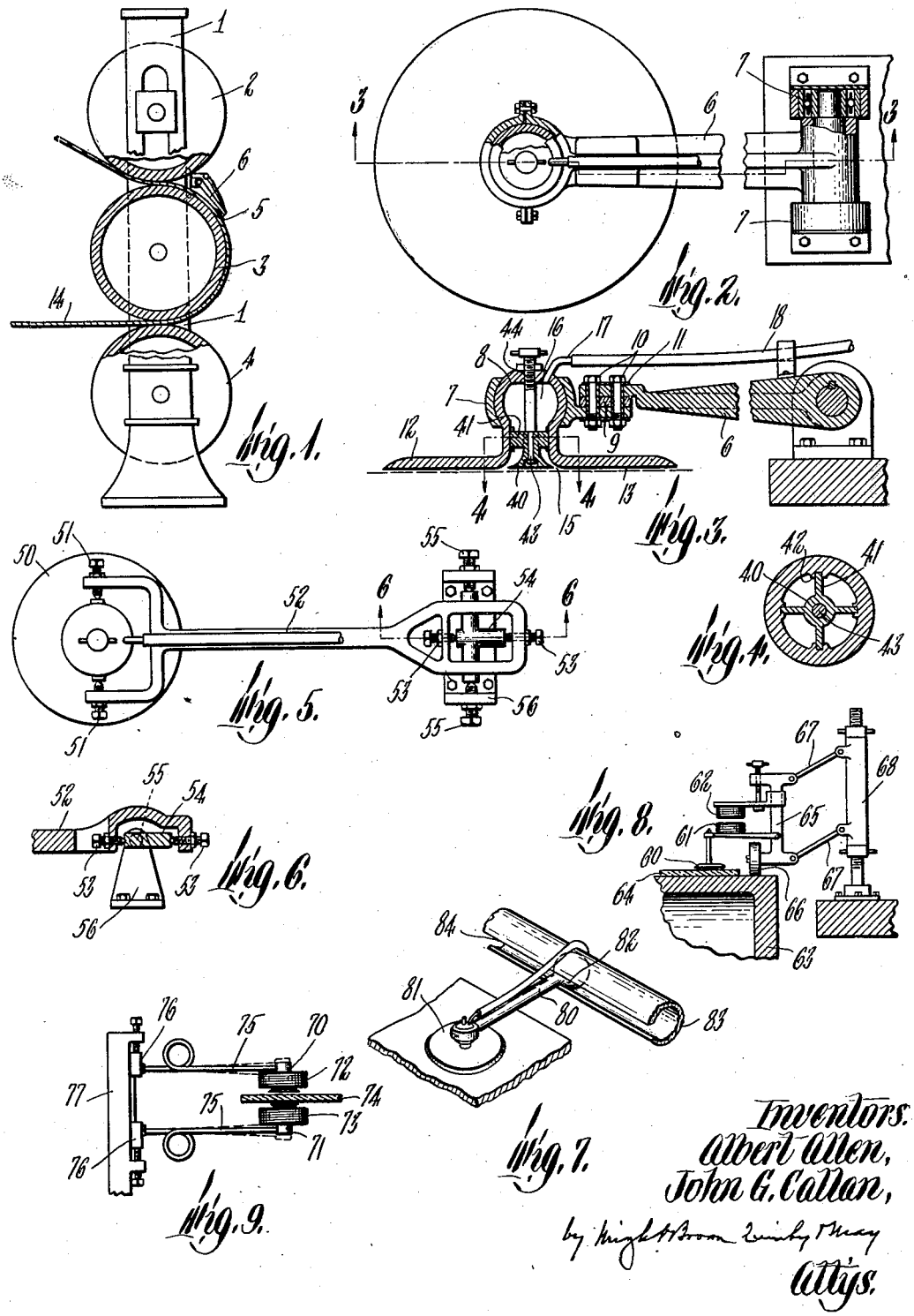
Inventors.
Albert Allen,
John G. Callan,
by their Attys.

Feb. 13, 1934.  A. ALLEN ET AL  1,946,924
CALIPERING MECHANISM
Filed Feb. 18, 1928   2 Sheets-Sheet 2
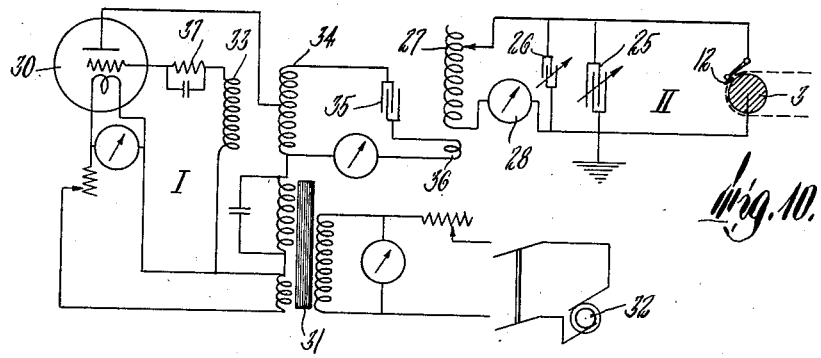
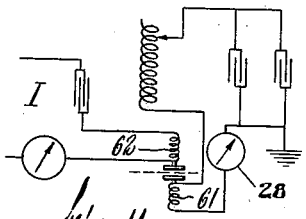
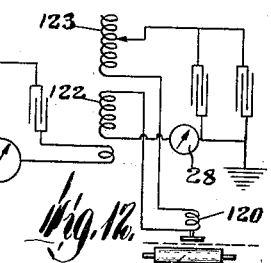
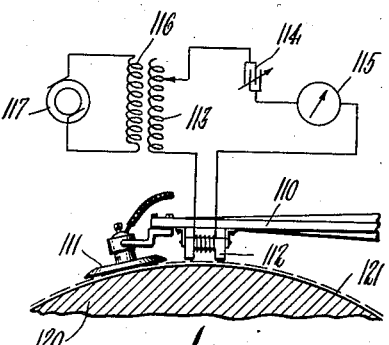
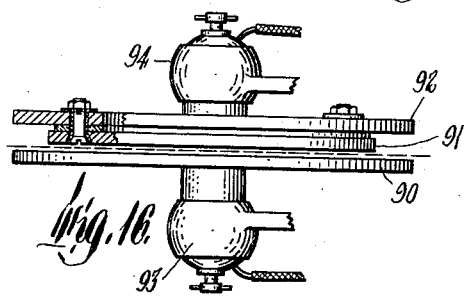
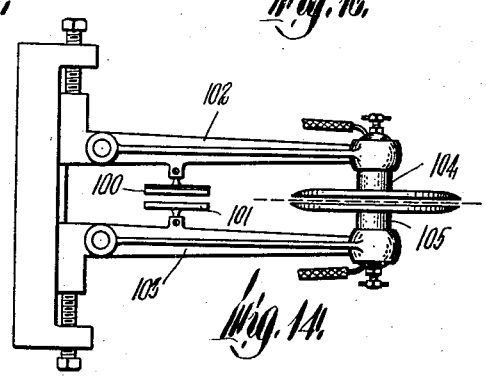
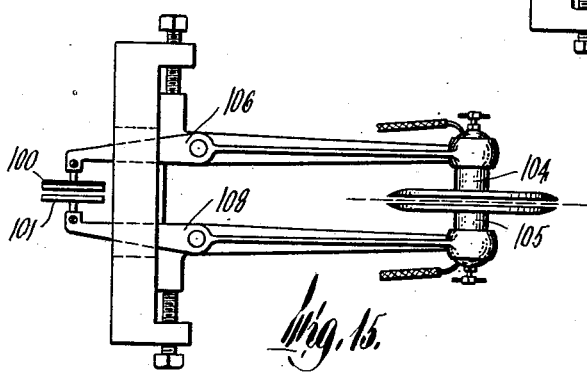
Inventors:
Albert Allen,
John G. Callan,
by Wright Brown Quimby May
Attys.

Patented Feb. 13, 1934

1,946,924

UNITED STATES PATENT OFFICE

1,946,924

CALIPERING MECHANISM

Albert Allen, Winchester, and John G. Callan, Cambridge, Mass., assignors to Atlantic Precision Instrument Company, Boston, Mass., a corporation of Massachusetts Application February 18, 1928. Serial No. 255,364

9 Claims. (Cl. 33—125)

It has been attempted heretofore to measure the thickness of sheet material by the use of a calipering element riding on its surface. Where the surface of the sheet material is slightly rough like that of ordinary paper and the element rides lightly thereon, it rides on the prominences and therefore it fails to give an indication of true average thickness. If it be attempted to apply pressure to crush down the prominences the amount to which they are crushed down is quite indefinite and depends on many conditions which can not be accurately controlled. For example in the case of paper the character of the fiber, the amount of beating and the moisture content of the calipered material would have an effect impossible to determine. In the case of measuring thickness of rubber, the character of the rubber and more particularly its temperature, are important factors to determine the extent to which the element will press down the surface under any given pressure. In some instances also pressure on the element would act to mar the surface of the material and detract from its value.

The present invention, therefore, has for an object the calipering of material by means which may determine a true average thickness and without the use of a calipering element directly contacting with the material, this being subject to the various limitations, inaccuracies and disadvantages heretofore mentioned.

A further object is to produce such a mechanism by which the thickness indication, however derived, may be indicated or recorded at a distance and by which, if desired, correcting mechanisms may be controlled tending to maintain the thickness of a moving web or sheet at a predetermined value.

In order to carry out the first mentioned object this invention makes use of a principle which exemplified in a rudimentary form has sometimes been termed the "pneumatic paradox". This comprises a simple disk or spool fed with compressed air through a hole in its center which is used to hold a piece of paper or like material closely to its face where the air issues, the paradox consisting in the fact that the sheet material is held close to the disk instead of being driven away therefrom by the force of the issuing jet of air.

The principle involved is that of an over-expanding nozzle obeying laws that constitute slight modifications of the well known laws of nozzle expansion particularly familiar to the designers of elastic fluid turbines. The elastic fluid fed to the relatively small central area—as for example the hole in a common spool placed adjacent to a card—turns to a direction parallel to the flat face of the disk and flows outwardly across progressively increasing sectional areas, transforming pressure head into velocity head and thus establishing a mean pressure over the disk which in a considerable range of proportions is less than the pressure of the external air into which the elastic fluid discharges at the outward periphery of said disk.

By application of the principles of nozzle design the effect of the "pneumatic paradox" and particularly the definiteness of the gap between the face of disk and the adjacent surface can be maximized.

In order to carry out the second mentioned object the position of the calipering element, and thereby the thickness of the material being calipered, is accurately indicated by a sensitive electrical mechanism the sensitivity of which is quite capable of indicating the caliper with the great accuracy with which a calipering element employing the pneumatic paradox principle can be made to maintain a calipering position.

For a more complete understanding of this invention, reference may be had to the accompanying drawings in which Figure 1 is an elevation partly broken away of a stack of rolls through which sheet material is passed showing one form of calipering element constructed according to this invention in operative position.

Figure 2 is a top plan on a larger scale and partly broken away of one form of the calipering element.

Figure 3 is a section on line 3—3 of Figure 2.

Figure 4 is a detail section on line 4—4 of Figure 3.

Figure 5 is a top plan of a different form of element.

Figure 6 is a detail section on line 6—6 of Figure 5.

Figure 7 is a perspective illustrating a further modification.

Figures 8 and 9 are fragmentary views illustrating two methods of using such calipering elements.

Figure 10 is a wiring diagram for the method of use shown in Figure 1.

Figures 11 and 12 are fragmentary wiring diagrams, Figure 11 illustrating the use of the mechanism shown in Figure 9.

Figure 13 is a fragmentary view somewhat diagrammatic showing another manner of use of the calipering element.

Figures 14, 15 and 16 are views illustrating various ways of using opposed calipering elements for controlling the position of condenser plates, thereby to vary the capacity of the condenser formed by these plates in accordance with the thickness of the material being calipered.

Referring first to Figures 1, 2 and 3, in Figure 1 is indicated at 1 a calender stack having calender rolls 2, 3 and 4. Material to be calipered, as at 14, is fed through this stack between the rolls 2 and 3, about one side of the roll 3, and then between the rolls 3 and 4. At 5 is shown a calipering element which lies adjacent to the outer face of the sheet material as it passes about the roll 3 and may rise or fall with variations in thickness of such material, being pivotally carried by the arm 6. This calipering element is shown more in detail in Figures 2 and 3. The arm 6 is shown as pivoted on the ball bearing supports 7 carried by a fixed portion of the calender frame, and as shown in Figure 3, its outer end portion is formed as a ball socket 7 for the reception of a ball portion 8 of the calipering element. This socket portion 7 is shown as insulated from the remaining portion of the arm 6, for a purpose which will later appear, as by means of the insulating strip 9 interposed between portions of the arm 6 and the ball socket, the three parts being fixed together as by means of the bolts 10 passing through insulating washers 11. The ball portion 8 is a part of a disk shaped calipering element 12 having a face 13 preferably slightly curved to conform closely to the curvature of the outer face of the sheet material 14 as it passes about the roll 3. While this is not essential in all cases it adds to the accuracy with which the calipering element responds to variations in thickness of the sheet material. This element 12 is centrally apertured as at 15, this aperture communicating with the hollow interior 16 of the ball portion 8 into which compressed gas such as air may be introduced through the pipe 17 which may be connected to a suitable source of air or other gas under pressure as by means of the flexible rubber tube 18.

The energy of the air issuing from the opening 15 is converted from pressure energy to kinetic energy as it is expanded between the outer face of the calipering element and the surface of the material being calipered, and its kinetic energy causes it to be over-expanded, that is, expanded to below atmospheric pressure, so that the atmosphere acting on the opposite face of the disk causes the disk to ride very close to the surface of the material being measured. The closeness with which it rides to the surface is dependent on the rate at which the compressed gas can escape around the edges of the element and also somewhat on the pressure of the gas and the size of the disk. With the same material, therefore, the position which the element occupies is controlled by the average thickness of the material and not by merely the thickest portions thereof as is the case with the ordinary calipering element which rides lightly directly on the face of the material. This calipering element, therefore, in effect floats at a predetermined distance from the average position of the face of the material and it is found in practice it holds to a given position with great accuracy and great tenacity so that its position may be used to indicate accurately the thickness of the material.

In order that an indication of the sensitiveness comparable with the accuracy with which such an element holds to its position may be had, this element may be used to control certain characteristics of an electric circuit capable of measuring very small changes in its position.

As shown in Figure 10, this element may be used as one member of a tuning condenser for one of a pair of high frequency oscillatory circuits arranged in the relation of primary and secondary circuits I and II, respectively, forming a high frequency transformer system. Thus the roll 3 may be grounded through the frame of the calender stack as illustrated in Figure 10 while the element 12 may form the opposite condenser plate which is arranged in series with tuning condensers 25 and 26 in the secondary oscillatory circuit II, which also contains an inductance 27 and a current measuring device 28.

By means of the tuning condensers 25 and 26 or through the variation of inductance 27, or both, the natural free period of the secondary circuit may be brought near to resonance to that of the primary exciting circuit I. This circuit, as shown, comprises a thermionic tube 30 which may derive its filament and plate voltage through a transformer 31 from a suitable source of alternating current indicated at 32. This primary circuit may have inductances 33 and 34 and a capacity 35 and may be coupled inductively or otherwise to the secondary circuit. As shown in Figure 10 it is inductively coupled by means of the coil 36, in inductive relation to the coil 27 to the secondary circuit II. At 37 is shown the usual grid resistance and condenser for oscillatory circuits of this description.

Changes of the spacing between the condenser plate 12 and the roll 3 will thus act to determine the detuning between the primary and secondary circuits which are tuned slightly out of resonance with each other, thus to determine the current response in the secondary circuit, and thus to change the indication of the instrument 28. This circuit is of the general type illustrated in the patent of Albert Allen for Indicating and controlling method and mechanism for paper making machines and the like, No. 1,708,074 granted April 9, 1929, but this invention is not dependent on any particular circuit.

In order that the effect of the component of pressure of the expanding gas under pressure issuing from the nozzle 15, which tends to separate the element 12 from the sheet material may be minimized, means are preferably provided, such as shown in Figure 3, to close off the central portion of the opening 15 so that the gas issuing therefrom may issue more nearly parallel to the outer face of the element. As shown in Figures 3 and 4 a generally frusto-conical element 40 may be used for this purpose, this element 40 being provided with fins 41 radiating therefrom at its smaller end which are positioned between guide ribs 42 projecting inwardly from the wall of the opening 15. The element 40 is centrally apertured for the passage of a headed rod 43, the outer end of which is threaded as at 44 and passes through the rear end of the ball head 8. By turning this rod 43 the position of the element 40 lengthwise of the opening 15 may be regulated as desired. This element 40 fills the central portion of the opening 15 and defines therewith an annular discharge orifice through which the issuing gas is conducted between the face of the disk 12 and the face of the material to be calipered with little component directed so as to tend to force the element away from the face of the material. The ball socket arrangement permits the calipering element to conform itself to the general contour of the surface of the material so that the action of the compressed gas during its expansion is substantially uniformly exerted.

In Figures 5 and 6 is shown a modified construction by which this limited universal motion of the calipering element may be produced. According to this construction the calipering disk 50 is mounted to swing about an axis formed by bearing screws 51 carried by the yoked outer extremity of the supporting arm 52. This supporting arm 52 is provided with similar bearing screws 53 arranged at right angles to the bearing screws 51, these bearings screws 53 engaging opposite arms of a T shaped element 54 which in turn is supported by bearing screws 55 from an anchoring plate 56, the bearing screws 55 being arranged at right angles to the bearing screws 53. The arm 52 is thus supported on gimbal joints from the anchoring plate 56 for rocking and axial turning while the calipering element is mounted for rocking about an axis at right angles to the rocking axis of the arm 52 so that the universal movement of this calipering element is provided.

There are many ways in which the position of the calipering element may be used to control the response of the electric circuit. Certain of these, in addition to that previously described, have been here illustrated. In Figure 8, for example, the calipering element 60 may be used to control the position of an inductance 61 with reference to an inductance 62. The position of the inductance 62 is controlled by the surface of a roll 63 over which the material 64 to be calipered passes. As shown this is accomplished by supporting the inductance 62 adjustably on an arm 65 carrying a roller 66 which rides on the margin of the roll 63 beyond the edge of the material 64. This arm 65 is guided for parallel movement by a pair of links 67 pivoted thereto and to a support 68. The inductance 62 thus follows the surface of the roll 63 and the inductance 61 follows the position of the upper face of the material 64 so that the nearness of these inductances to each other is dependent on the thickness of the material 64.

This construction may be taken advantage of to control the current response of the secondary circuit, as shown in Figure 11, the inductance 62 as shown being in the primary circuit I and the inductance 61 being in the secondary circuit, the nearness of these inductances to each other representing the degree of coupling between the two circuits.

In Figure 9 still another method of using such a calipering element has been indicated. Referring to this figure, it will be seen that two such elements are employed as at 70 and 71, each having an inductance coil as 72 and 73 thereon. These elements 70 and 71 are spaced so as to permit the passage of the material to be measured as at 74 therebetween and they are so mounted as to be free to take up positions relative to opposite faces of the material 74 as they may be impelled to do by the action of the expanding gas between them and the adjacent faces of the material. As shown each is mounted at the outer end of a resilient arm 75, each arm being supported in a block 76 adjustably carried on a fixed support 77. The inductance coils 72 and 73 may be arranged in the circuits similarly to the coils 62 and 61 of Figure 11.

Sometimes it may be desired to so mount the element that it may be moved along the face of the material being measured, as for example when it is desired to caliper different widthwise portions of a traveling sheet and this may be done as shown in Figure 7 in which the supporting arm 80 of the calipering element 81 may have a ball end 82 mounted to ride lengthwise within a tube 83 extending across the machine and having a slot 84 through which the stem of the member 80 may extend freely.

Instead of using an inductance or utilizing the calipering element itself as an element of a condenser, it may be utilized in other relations. For example, as shown in Figure 16, where two elements are employed between which the material passes, one of these elements as at 90 may be used directly as one plate of a condenser which may be grounded and the other as at 91 may carry in insulated relation therewith an annular plate 92 which may serve as the ungrounded or high frequency plate of the tuning condenser. This plate 92 is preferably of an outside diameter substantially that of the opposite calipering element 90. As shown these elements are mounted in ball joints as at 93 and 94 similar to the construction illustrated in Figures 2 and 3.

If desired also the condenser plates may be independent of the calipering elements, as illustrated in Figures 14 and 15. In Figure 14 these condenser elements are shown as plates 100 and 101 which are carried by the arms 102, 103 which support the opposed calipering elements 104, 105. In Figure 15 the supporting arms for the calipering elements are extended on the opposite side of their pivots as at 106, 108, these expanded portions carrying the condenser plates 100 and 101.

In Figure 12 an inductance 120 is shown as spaced from the metallic mass as of a roll 121 over which the material to be calipered is passed, this spacing being determined by the calipering element riding on the gas film on the opposite face of the material from the metallic mass. This inductance 120 is shown as in series with inductances 122 and 123 of the secondary oscillatory circuit which is excited by the primary circuit such as is shown completely in Figure 10. The inductance value of the inductance 120 is varied by variations in its spacing from the metallic mass by variations in caliper of the material being tested, eddy currents being induced in the metallic mass by the current in the inductance which react thereon. Thus the tuning of the secondary is varied with variations in caliper, which varies the current flow in the secondary.

It is also possible, but with less accuracy, to use an alternating current of ordinary frequency in the indication of the position of the calipering element. One method of doing this is illustrated in Figure 13 in which the arm 110 which carries the calipering element 111 carries also a horseshoe electro-magnet 112. This magnet is in series with an inductance 113, a variable capacity 114 and a current indicating instrument 115. The inductance 113 is placed in coupling relation to a primary coil 116 energized from a suitable alternating current source as at 117. Variations in the position of the calipering element 111 with relation to the metallic roll 120 over which the material to be measured passes, as at 121, causes variations in inductance of the horseshoe magnet winding 112 thus to vary the closeness to resonance between the circuit containing the indicator 105 and the primary alternating current circuit containing the inductance 116, these circuits being brought initially near to resonance to each as by manipulation of the condenser 114 or the inductance 113, or both, as may be required.

By reason of the electrical indication it is possible to produce such indication at any desired point, and through the use of suitable relays such as those shown in the Allen application for patent hereinbefore referred to, it is possible to set in motion corrective mechanisms to tend to maintain the caliper as indicated by the instrument, at a desired value.

Certain embodiments of this invention having thus been described it should be evident to those skilled in the art that various changes and modifications may be made without departing from the spirit or scope of this invention as defined by the appended claims.

We claim:

1. A mechanism of the class described comprising a plate, means for supporting said plate for movement into a position with one face closely adjacent to one face of sheet material which it is desired to caliper, means for introducing a compressed gas between said material and said face to be expanded to below atmospheric pressure therebetween, and means for indicating the resultant position of said plate relative to the opposite face of said sheet material.

2. A mechanism of the class described comprising a disk, means for supporting said disk with capability of universal turning and of bodily motion toward and from a face of material to be calipered, a member having a definite position with respect to the opposite face of said material said disk having an opening centrally thereof, means for introducing a gas under pressure through said opening between said disk and the adjacent face of said material, and means for indicating the resultant position of said disk relative to said member.

3. A mechanism of the class described comprising a disk, means for supporting said disk with its face closely adjacent to the face of the material to be calipered, a member having a definite position with respect to the opposite face of said material said disk having a central opening therethrough flaring toward the adjacent face of said material, means for conducting gas under pressure to said opening to pass between said material and disk, and means for indicating the relative spacing of said disk and member.

4. A mechanism of the class described comprising a pair of plates, means for supporting said plates yieldingly spaced to permit sheet material to be passed therebetween, said mechanism including means for expanding a compressed gas to below atmospheric pressure between each of said plates and said sheet material, and means responsive to the resultant spacing of said plates to indicate the caliper of said material.

5. A calipering element presenting a disk-shaped face to the surface of material to be calipered, said element having a central perforation therethrough flaring toward said face, and a member seated centrally in said perforation at said face and defining with the wall of said perforation an annular nozzle.

6. A calipering element having a face formed to lie closely against a surface of material to be calipered, said element having a perforation therethrough through which a gas under pressure may be introduced between said face and surface, and means for reducing the component of pressure of said gas tending to drive said element and material away from each other.

7. A calipering element comprising a disk having a face formed to lie closely against a surface of material to be calipered and a perforation opening in said face, and having an extension from the opposite face thereof terminating in a hollow spherical head, the hollow of said head communicating with said perforation opening in said first mentioned face, a support having a bearing for said head permitting universal pivotal movement of said element, and means for conducting a gas under pressure to the entrance of said head to escape through said perforation.

8. A calipering element comprising a disk having a face formed to lie closely against a surface of material to be calipered and a perforation opening in said face, and having an extension from the opposite face thereof terminating in a hollow spherical head, the hollow of said head communicating with said perforation opening in said first mentioned face, a support having a bearing for said head permitting universal pivotal movement of said element, means for conducting a gas under pressure to the hollow of said head to escape through said perforation, and a member centrally disposed in said perforation defining with the wall thereof an annular discharge orifice for said gas.

9. A calipering element comprising a disk having a face formed to lie closely against a surface of material to be calipered and a perforation opening in said face, and having an extension from the opposite face thereof terminating in a hollow spherical head, the hollow of said head communicating with said perforation opening in said first mentioned face, a support having a bearing for said head permitting universal pivotal movement of said element, means for conducting a gas under pressure to the hollow of said head to escape through said perforation, a member centrally disposed in said perforation defining with the wall thereof an annular discharge orifice for said gas, and means for adjustably fixing said member in position.

ALBERT ALLEN.
JOHN G. CALLAN.